US008406751B2

(12) United States Patent
Chan

(10) Patent No.: US 8,406,751 B2
(45) Date of Patent: Mar. 26, 2013

(54) MESSAGE HAVING A FIRST PROTOCOL REVISION FIELD INDICATING A MESSAGE FORMAT AND A SECOND PROTOCOL REVISION FIELD INDICATING MANDATORY FEATURES IN A STANDARDS REVISION

(75) Inventor: Leslie Chiming Chan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1330 days.

(21) Appl. No.: 11/291,678

(22) Filed: Nov. 30, 2005

(65) Prior Publication Data

US 2006/0142049 A1 Jun. 29, 2006

Related U.S. Application Data

(60) Provisional application No. 60/633,348, filed on Dec. 3, 2004.

(51) Int. Cl.
*H04M 1/00* (2006.01)

(52) U.S. Cl. ..................................... 455/418; 455/550.1

(58) Field of Classification Search .................. 455/418, 455/414.1, 450; 370/329, 331, 335, 350
See application file for complete search history.

(56) References Cited

U.S. PATENT DOCUMENTS

| 5,337,345 | A | 8/1994 | Cassidy et al. |
| 6,167,261 | A | 12/2000 | Amin |
| 6,249,681 | B1 * | 6/2001 | Virtanen ........................ 455/466 |
| 6,603,974 | B1 | 8/2003 | Rollender |
| 6,810,261 | B1 | 10/2004 | Rollender |
| 2002/0028673 | A1 | 3/2002 | Chang et al. |
| 2003/0050053 | A1 | 3/2003 | Wang et al. |
| 2003/0103484 | A1 | 6/2003 | Oommen et al. |
| 2003/0133494 | A1 | 7/2003 | Bender et al. |
| 2004/0147242 | A1 | 7/2004 | Pasanen et al. |
| 2005/0135403 | A1 * | 6/2005 | Ketchum et al. ............... 370/437 |
| 2008/0146239 | A1 * | 6/2008 | Wang et al. .................... 455/442 |

FOREIGN PATENT DOCUMENTS

| CN | 1500331 | 5/2004 |
| JP | 2000004472 A | 1/2000 |
| JP | 2000261862 | 9/2000 |
| JP | 2000261863 | 9/2000 |
| JP | 2002261911 | 9/2002 |
| JP | 2003061155 | 2/2003 |
| JP | 2003122576 | 4/2003 |
| JP | 2007501580 T | 1/2007 |
| WO | 0111911 | 2/2001 |
| WO | WO2004107796 A1 | 12/2004 |

OTHER PUBLICATIONS

Anonymous "Tdoc N1-9960" Internet Article, Jun. 1, 1999.
Anonymous "TDMA Third Generation Wireless Extended Revision Guidelines (ERG) Incorporation of MEID; TIA-943" Incorporation of MEID, Oct. 2003.

(Continued)

*Primary Examiner* — Sam Bhattacharya
(74) *Attorney, Agent, or Firm* — Kristine V. Ekwueme

(57) ABSTRACT

A mobile station for wireless communication includes a control processor configured to generate a message for transmission on a reverse channel, the message including a first protocol revision field and a second protocol revision field. The first protocol revision field is for indicating a message format supported by the mobile station and the second protocol revision field is for indicating a set of mandatory features supported by the mobile station, the set of mandatory features defined by a standards revision.

18 Claims, 3 Drawing Sheets

OTHER PUBLICATIONS

International Search Report—PCT/US05/043665, International Search Authority—European Patent Office—Apr. 13, 2006.
Written Opinion—PCT/US05/043665, International Search Report—European Patent Office—Apr. 13, 2006.
International Preliminary Report on Patentability—PCT/US05/043665, The International Bureau of WIPO—Geneva, Switzerland—Jun. 5, 2007.
3GPP2 C.S0005-C Version 2.0, 2004. 08, pp. 2-7, 2-597, 2-598, 2-599, 2-611 and 23-635.
International Search Report—PCT/US06/001422, International Search Authority—European Patent Office—Jun. 23, 2006.
Written Opinion—PCT/US06/001422, International Search Report—European Patent Office—Jun. 23, 2006.

* cited by examiner

| FIELD | LENGTH (BITS) |
|---|---|
| 502 — MOB_TERM | 1 |
| 504 — SLOT_CYCLE_INDEX | 3 |
| 506 — MF_P_REV | 8 |
| 508 — SCM | 8 |
| ⋮ | ⋮ |
| 518 — RESERVED | 0 OR 1 |
| 520 — REV FCH GATING REQ | 0 OR 1 |

MESSAGE HAVING A FIRST PROTOCOL REVISION FIELD INDICATING A MESSAGE FORMAT AND A SECOND PROTOCOL REVISION FIELD INDICATING MANDATORY FEATURES IN A STANDARDS REVISION

CLAIM OF PRIORITY UNDER 35 U.S.C. §119

The present application for patent claims priority to Provisional Application No. 60/633,348 entitled "Minor MOB_P_REV for Migration of IS-2000 Revision" filed Dec. 3, 2004, and assigned to the assignee hereof and hereby expressly incorporated by reference herein.

BACKGROUND

1. Field

The present invention relates generally to wireless communication, and more specifically to cellular wireless communication.

2. Background

The field of communications has many applications including, e.g., paging, wireless local loops, Internet telephony, and satellite communication systems. An exemplary application is a cellular telephone system for mobile subscribers. (As used herein, the term "cellular" system encompasses both cellular and personal communications services (PCS) system frequencies.) Modern communication systems, such as a wireless communication system, designed to allow multiple users to access a common communications medium have been developed for such cellular systems. These modern communication systems may be based on multiple access techniques such as code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless communication systems have been established including, e.g., Advanced Mobile Phone Service (AMPS), Global System for Mobile communication (GSM), and other wireless systems.

In FDMA systems, the total frequency spectrum is divided into a number of smaller sub-bands and each user is given its own sub-band to access the communication medium. Alternatively, in TDMA systems, the total frequency spectrum is divided into a number of smaller sub-bands, each sub-band is shared among a number of users, and each user is allowed to transmit in predetermined time slots using that sub-band. A CDMA system provides potential advantages over other types of systems, including increased system capacity. In CDMA systems, each user is given the entire frequency spectrum for all of the time, but distinguishes its transmission through the use of a unique code.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), and (3) the standard offered by a consortium named "3rd Generation Partnership Project 2" (3GPP2) and embodied in "TR-45.5 Physical Layer Standard for cdma2000 Spread Spectrum Systems" (the IS-2000 standard).

In the above named CDMA communication systems and standards, the available spectrum is shared simultaneously among a number of users, and suitable techniques are available to provide services, such as voice and data services.

Electronic serial numbers (ESNs), a 32 bit binary number, are currently used to uniquely identify each mobile station manufactured by the various mobile station manufacturers. In view of the proliferation of the use of mobile stations, such as cellular telephones, the ESNs may eventually be depleted and therefore, a new unique mobile station identifier was developed and standardized, known as Mobile Station Equipment Identifier (MEID) which is a 56 bit number. The MEID is one of the mandatory features in Revision D of the IS-2000 family of standards. The IS-2000 family of standards includes revisions or releases to the originally adopted IS-2000 standard identified above. Such revisions include Revisions 0, A, B, C, and D. Today, the predominant IS-2000 standard deployed is IS-2000 Revision 0 and in order for the wireless cellular operators to deploy subsequent revisions, such as Revision D, time consuming and expensive interoperability tests have to be performed to ensure that mobile stations are backward compatible with Revisions 0, A, B, and C and the network requires a suitable upgrade. However, the ESNs may be depleted before such tests and network upgrades are completed.

SUMMARY

In one aspect, a mobile station for wireless communication is disclosed. The mobile station includes a control processor configured to generate a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

In another aspect, a method of operating a mobile station is disclosed. The method includes generating a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

In yet another aspect, a machine-readable medium comprising instructions, the instructions when executed by the machine, cause the machine to perform operations in a mobile station, is disclosed. The operations include generating a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

In yet another aspect, a mobile station for wireless communication is disclosed. The mobile station includes means for generating a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision, and means for transmitting the message on the reverse channel.

In yet another aspect, a base station for wireless communication is disclosed. The base station includes a receiver configured to receive a message on a reverse channel from a mobile station, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

In yet another aspect, a machine-readable medium comprising instructions, the instructions when executed by the machine, cause the machine to perform operations, is disclosed. The operations include receiving a message on a reverse channel from a mobile station, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

DETAILED DESCRIPTION

The word "exemplary" is used herein to mean "serving as an example, instance, or illustration." Any embodiment described herein as "exemplary" is not necessarily to be construed as preferred or advantageous over other embodiments.

A remote station, also known as a mobile station (MS), an access terminal (AT), user equipment (UE) or subscriber unit, may be mobile or stationary, and may communicate with one or more base stations, also known as base transceiver stations (BTSs) or node Bs. A remote station transmits and receives data packets through one or more base stations to a base station controller, also known as radio network controllers (RNCs). Base stations and base station controllers are parts of a network called an access network. An access network transports data packets between multiple remote stations. The access network may be further connected to additional networks outside the access network, such as a corporate intranet or the Internet, and may transport data packets between each remote station and such outside networks. A remote station that has established an active traffic channel connection with one or more base stations is called an active remote station, and is said to be in a traffic state. A remote station that is in the process of establishing an active traffic channel connection with one or more base stations is said to be in a connection setup state. A remote station may be any data device that communicates through a wireless channel. A remote station may further be any of a number of types of devices including but not limited to PC card, compact flash, external or internal modem, or wireless phone. The communication link through which the remote station sends signals to the base station is called an uplink, also known as a reverse link. The communication link through which a base station sends signals to a remote station is called a downlink, also known as a forward link.

Figure 1:
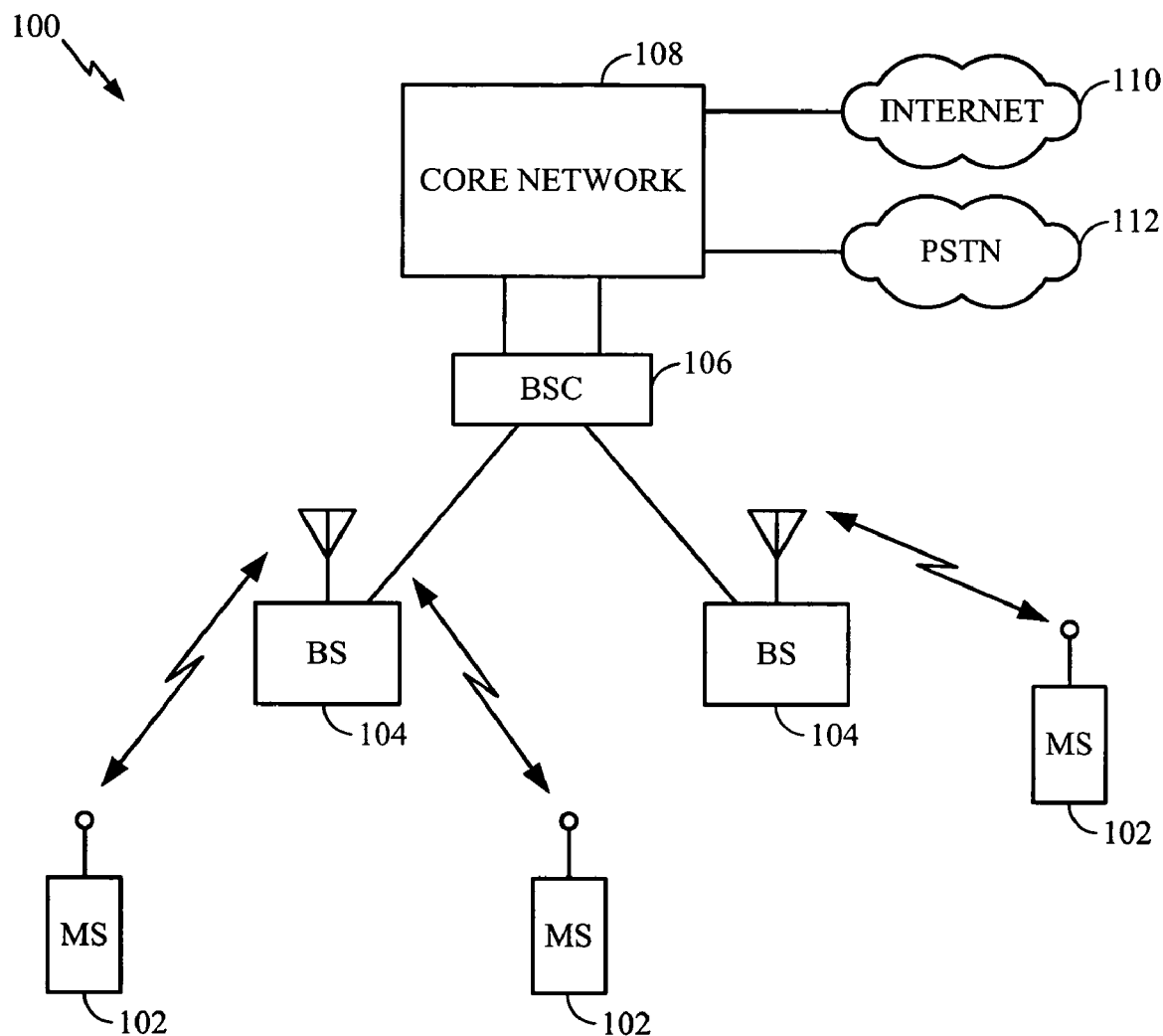
FIG. 1 is an example of a wireless communication system.

With reference to FIG. 1, an exemplary wireless communication system 100 includes one or more mobile stations (MS) 102, one or more base stations (BS) 104, one or more base station controllers (BSC) 106, and a core network 108. Core network may be connected to an Internet 110 and a Public Switched Telephone Network (PSTN) 112 via suitable backhauls. Wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Figure 2:
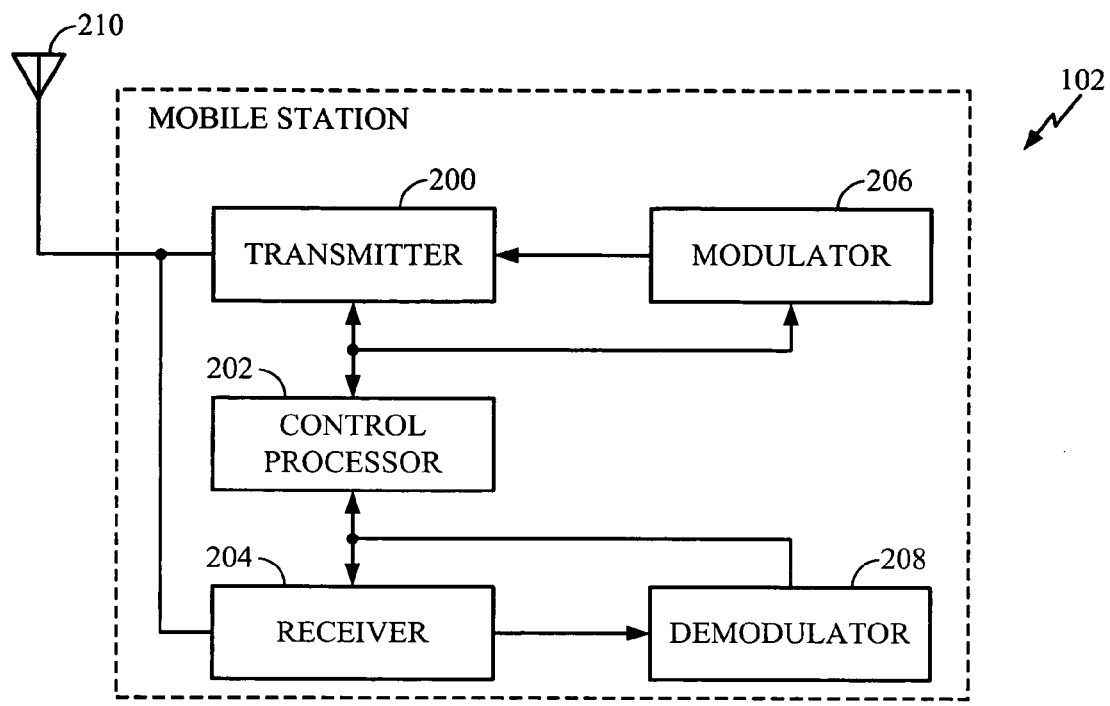
FIG. 2 is a block diagram of a mobile station in accordance with an embodiment of the present invention.
Figures 4, 5:
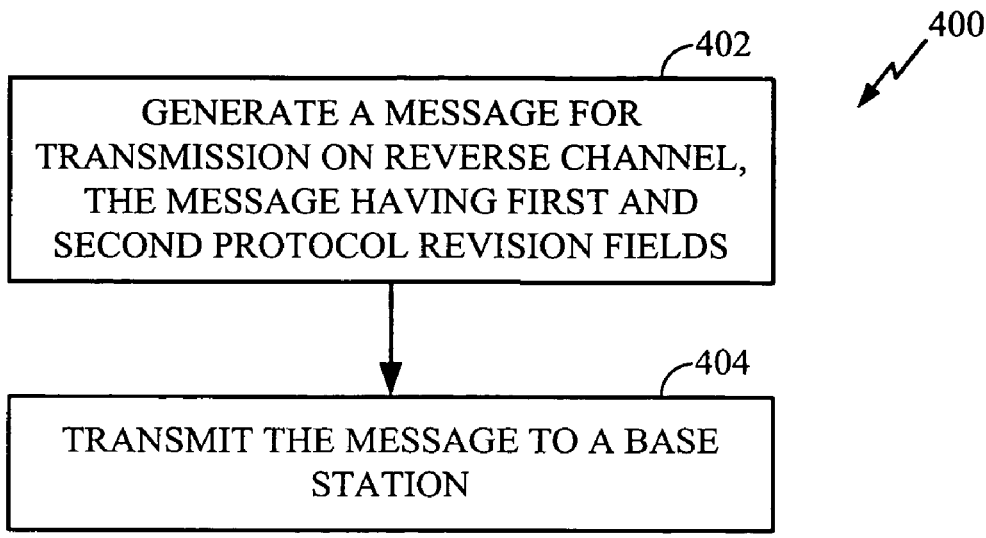
FIG. 4 is a flow diagram of a process which may be implemented by a mobile station according to an embodiment of the present invention.
FIG. 5 is an example of an origination message transmitted by the mobile station of FIG. 2 in accordance with an embodiment of the present invention.

With reference to FIGS. 2 and 5, in one embodiment, mobile station 102 for wireless communication includes a control processor 202 configured to generate a message, such as origination message 500, for transmission on a reverse channel, message 500 including a first protocol revision field 506 and a second protocol revision field 508, first protocol revision field 506 for indicating a message format supported by mobile station 102 and second protocol revision field 508 for indicating a set of mandatory features supported by mobile station 102, the set of mandatory features defined by a standards revision. In one embodiment, the reverse channel may be a reverse common signaling channel. In another embodiment, the reverse channel may be a reverse dedicated signaling channel.

In one embodiment, the message is selected from a group including origination message 500 (as shown in FIG. 5), a page response message, and a registration message. In various embodiments, the standards revision is selected from a group including IS-2000 Revision 0, IS-2000 Revision A, IS-2000 Revision B, IS-2000 Revision C, and IS-2000 Revision D. In one embodiment, the message format supported by mobile station 102 is defined by the IS-2000 Revision D standards revision which includes MED as a mandatory feature.

Continuing with FIG. 2, mobile station 102 includes a transmitter 200, a modulator 206, a receiver 204, a demodulator 208, and an antenna 210, the functions of which are known in the art.

Continuing with FIG. 5, in one embodiment, message 500 is an origination message transmitted by mobile station 102 to base station 104 (see FIG. 1) to establish a call. Origination message 500 includes various fields such as mobile terminated calls accepted indicator (MOB_TERM) 502, slot cycle index (SLOT_CYCLE_INDEX) 504, a message format protocol revision (MF_P_REV) 506, a station class mark (SCM) 508, . . . a reserved bit (RESERVED) 516, and a reverse fundamental gating mode request indicator (REV FCH GATING REQ) 520.

In the current IS-2000 Revision 0 standard, an 8 bit field, known as MOB_P_REV, is embedded in a number of messages, such as an origination message, and is used by the mobile station to indicate the particular protocol or standards revision it supports; for example, a value of 6 is used to indicate that a mobile station supports IS-2000 Revision 0 standard. Therefore, in the current IS-2000 Revision 0 standard, a single value (e.g., 6) represented by the MOB_P_REV field implies both the message format and the mandatory feature set of that standards revision represented by the number 6.

Significantly, in one embodiment, message format protocol revision field 506 is the first protocol revision field ("Major MOB_P_REV") for indicating a message or protocol format supported by mobile station 102 and station class mark field 508 is the second protocol revision field ("Minor MOB_P_REV") for indicating a set of mandatory features supported by mobile station 102. A suitable number of bits within the 8 bit station class mark field 508 may be used to indicate a set of mandatory features defined by a standards revision. For example, the suitable number of bits within SCM 508 may be used to represent a value which identifies a set of mandatory features for a given standard, such as the IS-2000 family of standards, as follows: "0"—all mandatory features for Revision 0, "1"—all mandatory features for Revision A, "2"—all mandatory features for Revision B, "3"—all mandatory features for Revision C, P_REV 9, "4"—all mandatory features for Revision C, P_REV 10, "5"—all mandatory features for Revision D, "6" or higher—particular mandatory features in Revision D. For example, a MF_P_REV value of "11" and a value of "0" represented by a suitable number of bits within SCM 508 will be "understood" by a base station that the mobile station supports a message format defined by IS-2000 Revision D standard and that it also supports all mandatory features of the Revision 0 standard. Such a bifurcation of the protocol revision field allows a more progressive migration toward later revisions of a standard, such as IS-2000, by using the latest message format, such as the message format defined by Revision D, but phase in the actual mandatory features supported by a mobile station with the use of the second protocol revision field. In an alternative embodiment, revision field 506 may be used as the second protocol revision field and SCM field 508 may be used as the first protocol revision field.

With reference to FIG. 4, in one embodiment, a flow diagram of a process 400 is shown in which process 400 may be implemented by a control processor in conjunction with other components of a mobile station, such as control processor 202 of mobile station 102, as shown in FIG. 2. Process 400 includes at 402, generating a message for transmission on a reverse channel, the message including a first protocol revision field and a second protocol revision field, the first protocol revision field for indicating a message format supported by mobile station 102 and the second protocol revision field for indicating a set of mandatory features supported by mobile station 102, the set of mandatory features defined by a standards revision. Process 400 includes at 404, transmitting the message to base station 104.

Figure 3:
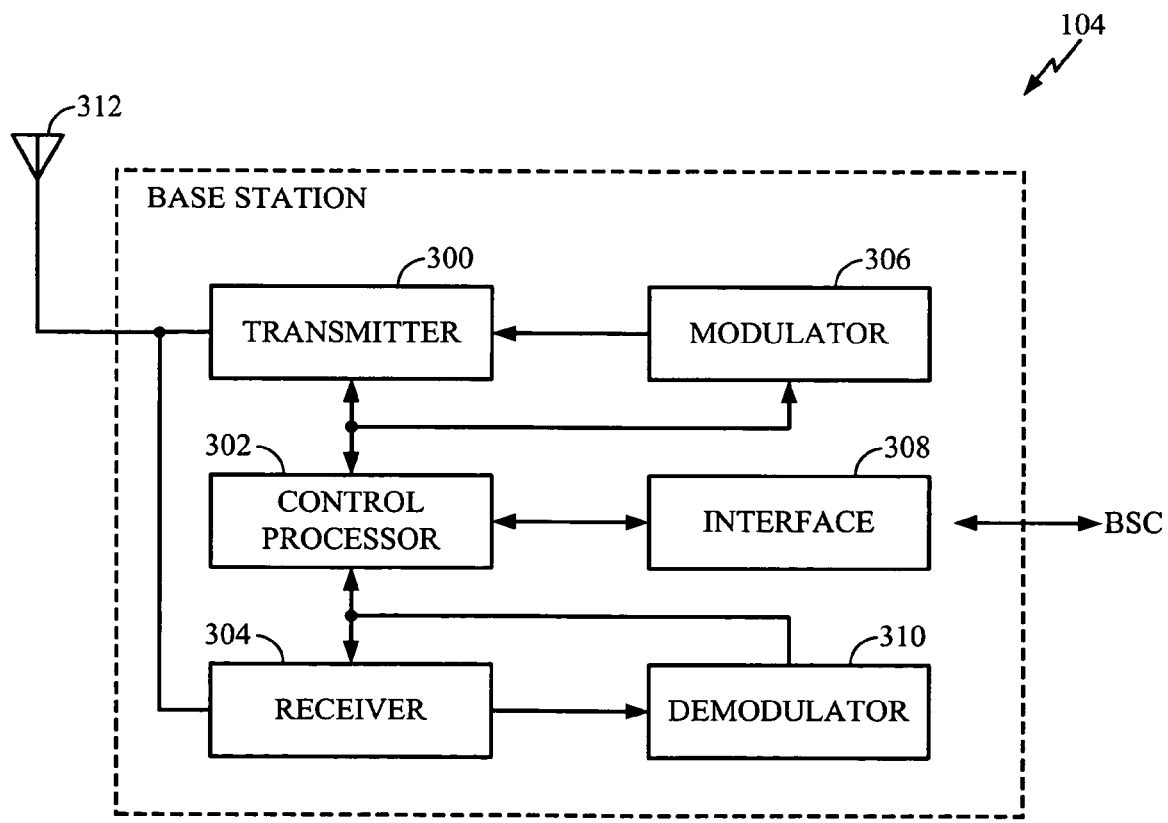
FIG. 3 is a block diagram of a base station in accordance with an embodiment of the present invention.

With reference to FIG. 3, in one embodiment, base station 104 for wireless communication includes a receiver 304 configured to receive a message on a reverse channel from mobile station 102, the message including a first protocol revision field and a second protocol revision field, the first protocol revision field for indicating a message format supported by mobile station 102 and the second protocol revision field for indicating a set of mandatory features supported by mobile station 102, the set of mandatory features defined by a standards revision.

Continuing with FIG. 3, base station 104 includes a modulator 306, an interface 308 for communicating with a BSC, such as BSC 106 shown in FIG. 1, a transmitter 300, a control processor 302, a demodulator 310, and an antenna 312, the functions of which are known in the art. In one embodiment, the transmitter and the receiver in either the mobile station or the base station may be separate components as shown. In another embodiment, the transmitter and receiver in either the mobile station or the base station may be a single component, commonly referred to as a "transceiver."

In another aspect of the present invention, a machine-readable medium comprising instructions, the instructions when executed by the machine, cause the machine to perform operations in a mobile station is disclosed. The operations include generating a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

In one embodiment, the machine-readable medium may be a disk based medium such as a CD-ROM.

In yet another aspect of the present invention, a mobile station for wireless communication is disclosed. The mobile station includes means for generating a message for transmission on a reverse channel, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision. Such a means for generating may suitably include control processor 202 as shown, for example, in FIG. 2. The mobile station includes a means for transmitting the message on the reverse channel which may suitably include transmitter 200 also shown in FIG. 2.

In yet another aspect of the present invention, a machine-readable medium comprising instructions, the instructions when executed by the machine, cause the machine to perform operations, is disclosed. The operations include receiving a message on a reverse channel from a mobile station, the message including a first protocol revision field and a second protocol revision field, the first protocol revision field for indicating a message format supported by the mobile station and the second protocol revision field for indicating a set of mandatory features supported by the mobile station, the set of mandatory features defined by a standards revision.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile station for wireless communication, the mobile station comprising:
    a control processor configured to generate a message for transmission on a reverse channel, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision.

2. The mobile station of claim 1, wherein the message is selected from a group including an origination message, a page response message, and a registration message.

3. The mobile station of claim 2, wherein the standards revision is selected from a group including IS-2000 Revision 0, IS-2000 Revision A, IS-2000 Revision B, IS-2000 Revision C, and IS-2000 Revision D.

4. The mobile station of claim 3, wherein the message format supported by the mobile station is defined by the IS-2000 Revision D standards revision.

5. A method of operating a mobile station, comprising:
    generating a message for transmission on a reverse channel, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision.

6. The method of claim 5, wherein the message is selected from a group including an origination message, a page response message, and a registration message.

7. The method of claim 6, wherein the standards revision is selected from a group including IS-2000 Revision 0, IS-2000 Revision A, IS-2000 Revision B, IS-2000 Revision C, and IS-2000 Revision D.

8. The method of claim 7, wherein the message format supported by the mobile station is defined by the IS-2000 Revision D standards revision.

9. A machine-readable medium comprising instructions, the instructions when executed by the machine, cause the machine to perform operations in a mobile station comprising:
    generating a message for transmission on a reverse channel, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision.

10. A mobile station for wireless communication, the mobile station comprising:
    means for generating a message for transmission on a reverse channel, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision; and
    means for transmitting the message on the reverse channel.

11. The mobile station of claim 10, wherein the message is selected from a group including an origination message, a page response message, and a registration message.

12. The mobile station of claim 11, wherein the standards revision is selected from a group including IS-2000 Revision 0, IS-2000 Revision A, IS-2000 Revision B, IS-2000 Revision C, and IS-2000 Revision D.

13. The mobile station of claim 12, wherein the message format supported by the mobile station is defined by the IS-2000 Revision D standards revision.

14. A base station for wireless communication, the base station comprising:
    a receiver configured to receive a message on a reverse channel from a mobile station, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision.

15. The base station of claim 14, wherein the message is selected from a group including an origination message, a page response message, and a registration message.

16. The base station of claim 15, wherein the standards revision is selected from a group including IS-2000 Revision 0, IS-2000 Revision A, IS-2000 Revision B, IS-2000 Revision C, and IS-2000 Revision D.

17. The base station of claim 16, wherein the message format supported by the mobile station is defined by the IS-2000 Revision D standards revision.

18. A machine-readable medium comprising instructions, the instructions when executed by the machine, cause the machine to perform operations comprising:
receiving a message on a reverse channel from a mobile station, the message including a first protocol revision field, and a second protocol revision field, the first protocol revision field for indicating a message format supported by the mobile station and the second protocol revision field comprising a station class mark field for indicating a set of mandatory features supported by the mobile station, the set of mandatory features defined by a standards revision.

* * * * *